Sept. 7, 1926.  1,598,635
F. F. WOLF ET AL
MACHINE FOR WASHING CANS AND ANALOGOUS ARTICLES
Filed April 25, 1923   5 Sheets-Sheet 5

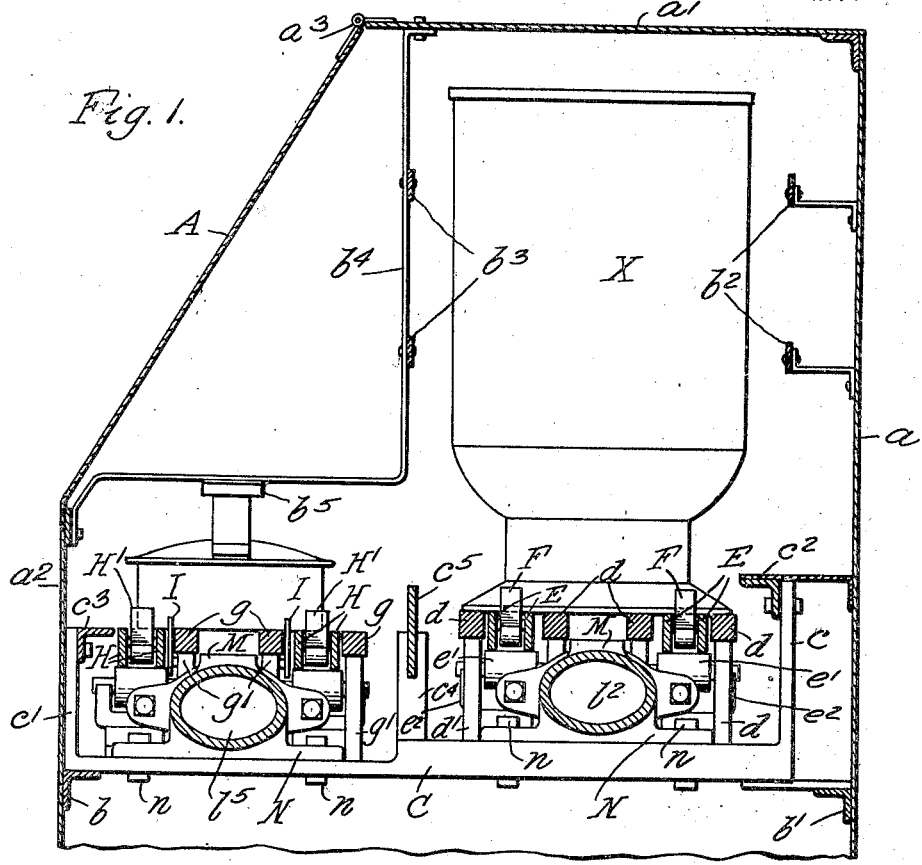

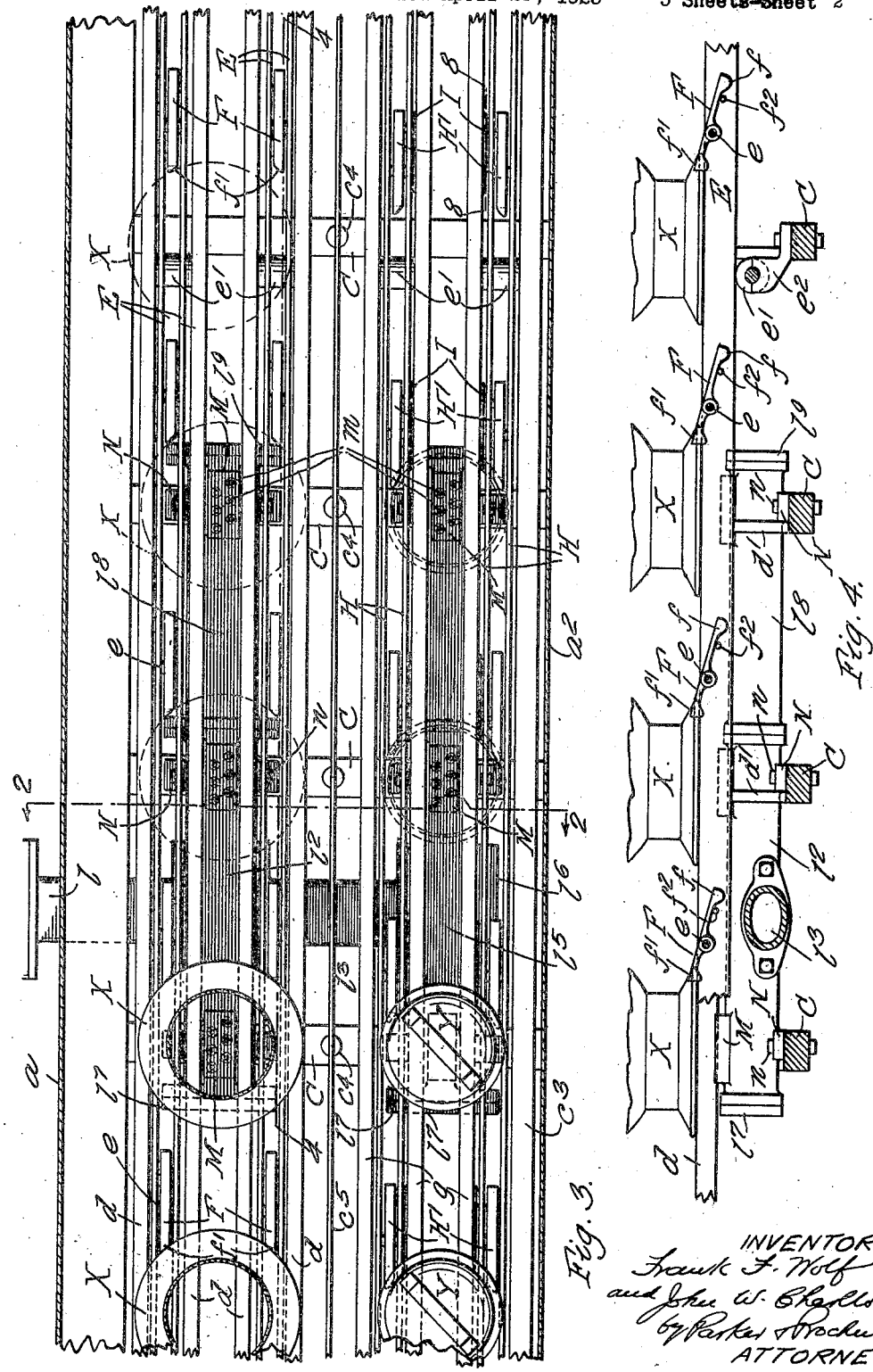

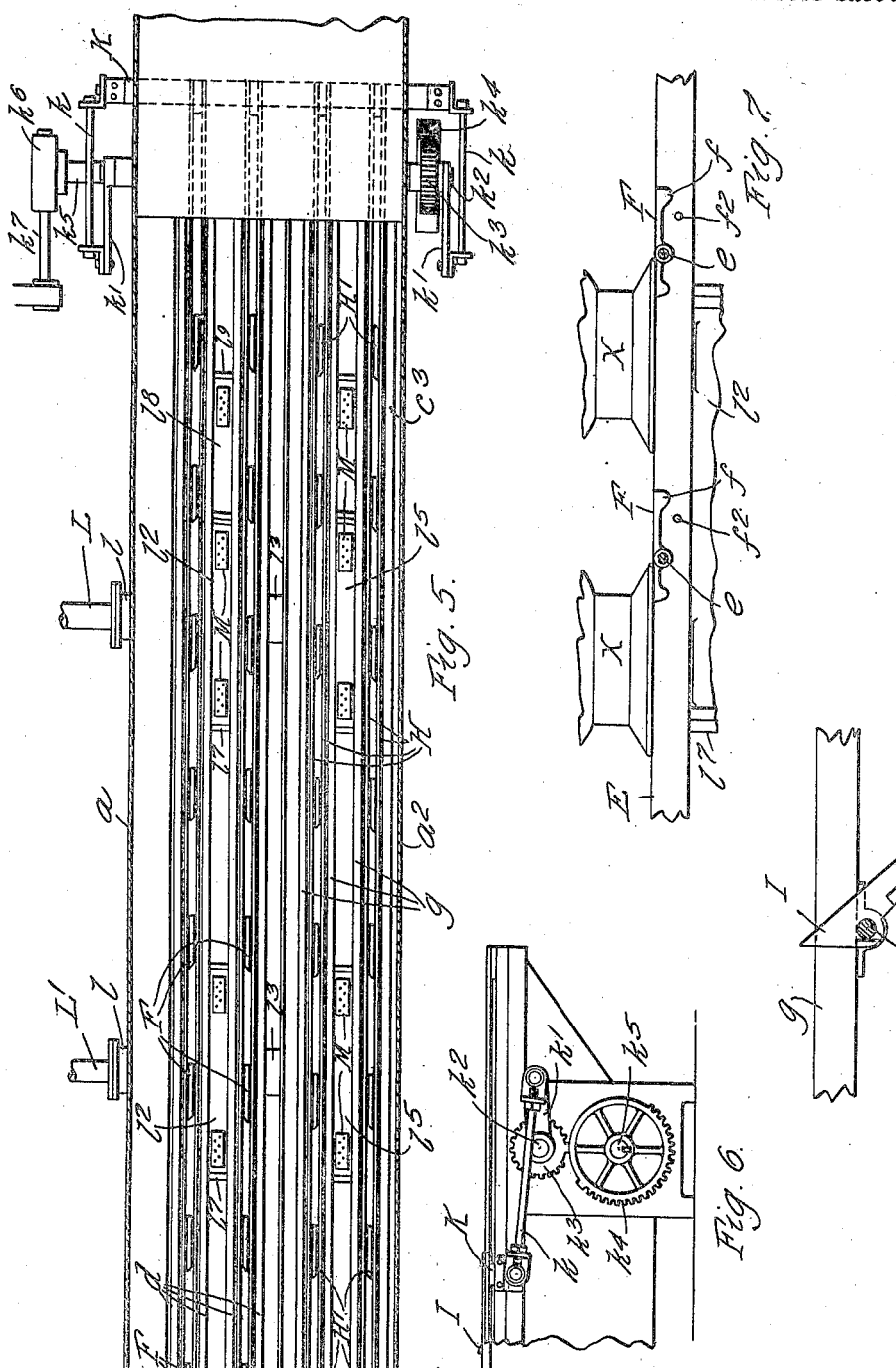

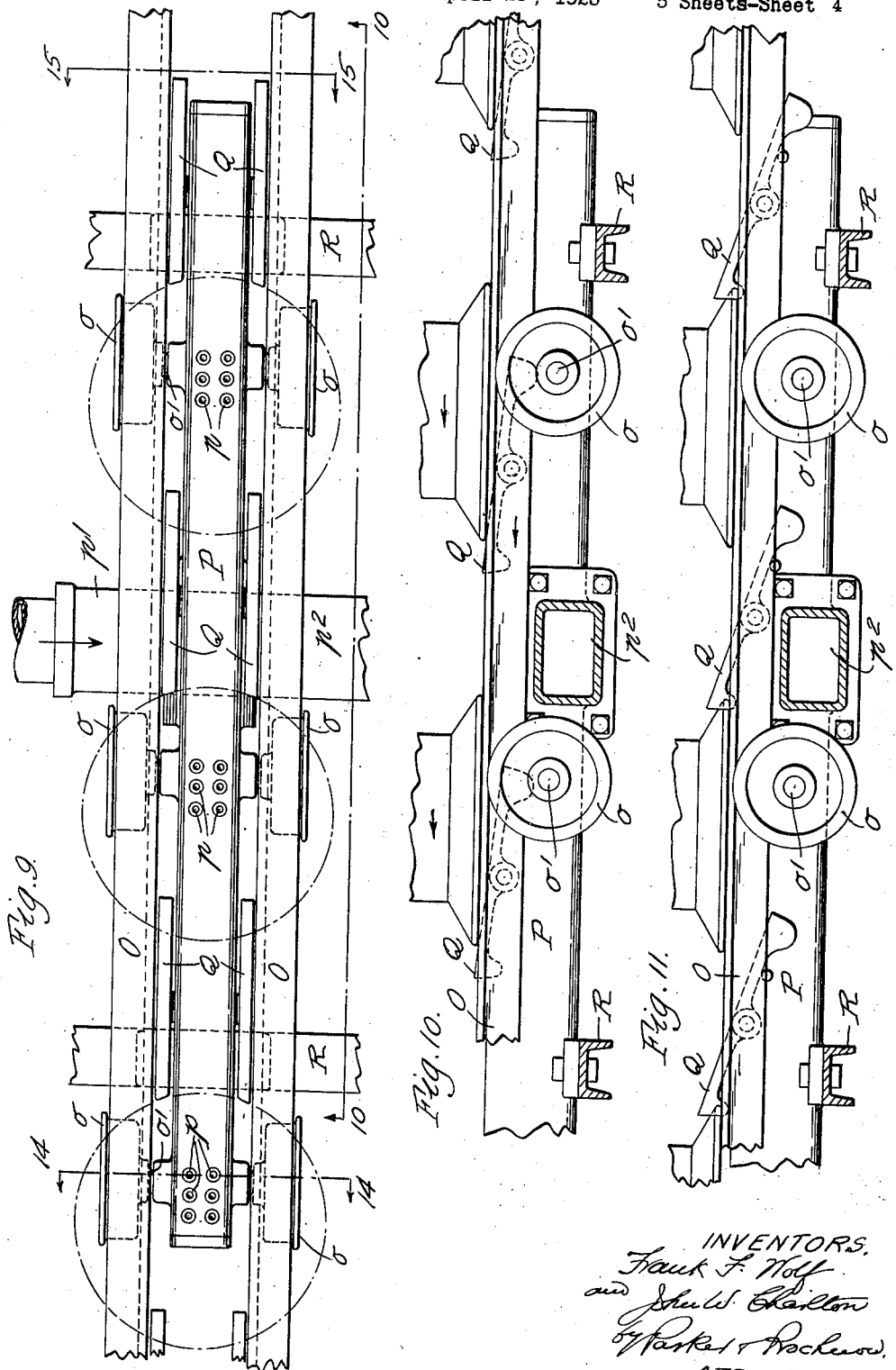

INVENTORS.
Frank F. Wolf
and John W. Charlton
by Parker & Brockwood.
ATTORNEYS.

Patented Sept. 7, 1926.

1,598,635

UNITED STATES PATENT OFFICE.

FRANK F. WOLF, OF BUFFALO, AND JOHN W. CHARLTON, OF NEW YORK, N. Y., ASSIGNORS TO RICE & ADAMS CORPORATION, OF BUFFALO, NEW YORK.

MACHINE FOR WASHING CANS AND ANALOGOUS ARTICLES.

Application filed April 25, 1923. Serial No. 634,453.

This invention relates to machines for use in washing milk cans and their covers, or analogous articles.

The objects of this invention are to provide a washing machine of this kind which is capable of operating successfully on cans or the like differing considerably from each other in size and shape, without requiring any adjustment of the machine; also to provide washing machines with mechanism of improved construction for advancing the articles intermittently through the machine; also to provide a machine of this kind with spraying means of improved construction for projecting the cleansing fluid to the cans; and also improve the construction of machines of this kind in other respects hereinafter specified.

In the accompanying drawings:—

Fig. 1 is a transverse sectional elevation of the upper portion of a washing machine embodying this invention.

Fig. 2 is a fragmentary transverse sectional elevation thereof on line 2—2, Fig. 3.

Fig. 3 is a sectional plan view thereof, the section being taken through the machine just above the spraying and advancing mechanism for the articles.

Fig. 4 is a longitudinal sectional elevation thereof on line 4—4, Fig. 3.

Fig. 5 is a sectional plan view thereof on a reduced scale showing the spray devices and article-advancing mechanism and the actuating mechanism therefor.

Fig. 6 is a side elevation of the means for intermittently operating the article-advancing mechanism.

Fig. 7 is a side elevation of the reciprocatory article-advancing members showing the same moving in a rearward direction.

Fig. 8 is a fragmentary sectional elevation thereof on line 8—8, Fig. 3, showing a dog for holding articles from being moved rearwardly by the advancing mechanism.

Fig. 9 is a fragmentary top plan view of a washing machine of modified construction.

Figs. 10 and 11 are longitudinal sectional elevations of the construction shown in Fig. 9, on line 10—10, Fig. 9.

Figure 14:
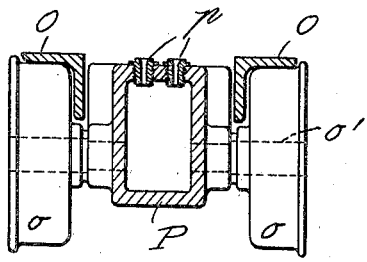
Figure 15:
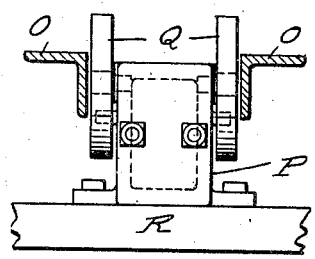

Figs. 14 and 15 are fragmentary transverse sectional elevations thereof on lines 14—14 and 15—15 respectively of Fig. 9.

The machine shown in the accompanying drawings is primarily intended for use in connection with the cleansing of milk cans and their covers, although it will be understood that it is not intended thereby to limit the invention to this particular use, since the machine can be used for washing analogous articles which are substantially circular or cylindrical in form.

In some dairies or other places where milk cans or the like are used, cans of a great many different sizes and shapes are employed, so that in passing these cans through washing machines as ordinarily constructed, cans having mouths of different sizes do not cooperate with the feeding mechanism in such a manner that the mouths of all of the cans, regardless of size, will be accurately centered over the various spraying devices. Consequently cans of this kind will not be thoroughly washed in such machines, and the machine embodying this invention is designed to overcome these difficulties.

The machine shown in the drawings, is enclosed in the usual casing or housing having a rear wall $a$, a top wall $a'$, a front wall $a^2$ and a hinged wall or cover portion A which may be swung about a hinge $a^3$ to render the machine accessible. Within this housing is arranged a series of longitudinal beams or members $b$ and $b'$ on which the mechanism for washing the articles and for feeding them through the machine is supported, and preferably suitable guide rails or tracks $b^2$ and $b^3$ are also provided within the housing and suitably supported from the walls thereof to hold the milk cans or other articles X in their upright positions in case these cans should be bent or deformed or should be improperly fed to the machine. The guide rails $b^3$ are supported on a series of angle shaped brace or supporting members $b^4$ which are secured in the construction shown, to the top wall $a'$ of the housing and to the front wall $a^2$ thereof and which extend over the covers Y passing through the machine. On these angle shaped supporting members are mounted suitable springs or devices such as indicated by $b^5$ for engaging the covers and holding the same in operative relation to the spray devices while passing through the machine. All of these parts have heretofore been used in connection with washing machines and of themselves constitute no part of this invention.

The longitudinal supporting bars or members $b$ and $b'$ of the machine are connected by a series of transverse bars or frame members C on which the spraying devices and article-supporting and advancing devices are mounted. These transversely extending members may be of any suitable or desired construction, those shown having at their opposite ends upwardly extending arms or parts $c$ and $c'$ which in turn are connected with longitudinal bars or members $c^2$ and $c^3$. The transverse supporting members C preferably also have upwardly extending posts or supports $c^4$ on which a longitudinally extending guide bar or member $c^5$ is mounted, this guide bar $c^5$ together with the longitudinal bar $c^2$, serving to limit the extent to which a can may be displaced with reference to the means for carrying the cans through the machine. These guide means $c^5$ and $c^2$ are not used in the ordinary operation of the machine, but in case a defective can is fed into the machine which is not properly guided by the feeding means, these guide means are used to prevent such a defective can or article from interfering with other articles passing through the machine.

The cans or other articles passing through the machine are preferably supported in an inverted position upon a plurality of parallel bars or grids $d$ extending lengthwise of the path of movement of the articles through the machine and preferably positioned at intervals at opposite sides of the center of the path of the movement of the articles through the machine. These grids or bars, in the construction shown, are mounted upon uprights or posts $d'$ extending upwardly from the transverse supporting member C. The upper faces of the bars or grids $d$ are adapted to support cans of different diameters and the cans are slid lengthwise of the machine upon these stationary guide tracks or rails, which, however, are so formed as not to interfere in any way with the free movement of the cans or other articles. Any other means for supporting the cans or articles in an inverted position while they are passing through the machine and which does not interfere with the free lateral movement of the cans may be employed if desired.

The mechanism for advancing the cans shown in Figs. 1 to 8, preferably includes two pairs of parallel reciprocating bars E which are movable lengthwise of the machine, each pair of parallel bars being preferably ararnged between a pair of adjacent stationary grids $d$. The lower faces of the advancing bars, in the construction shown, rest upon a series of rollers $e'$ supported from the transverse bars C by means of brackets or the like $e^2$. These advancing bars are provided with means spaced at intervals for engaging the cans and advancing the same and in the particular construction shown, these can-engaging and advancing means are in the form of detents, latches or dogs F mounted on the reciprocatory bars E. The bars E of each pair are spaced apart by means of rivets or the like $e$ which also form pivots for the dogs or latches F which are preferably arranged between the bars E. These dogs or latches are provided with heavy or weighted ends $f$ which tend to hold the dogs in the positions shown in Fig. 4 and the opposite ends of the dogs are provided with faces $f'$ adapted to engage the cans or other articles to be fed through the machine. Means are preferably provided for limiting the swinging of the dogs about their pivots, such for example, as pins $f^2$ secured in one or both of the article-advancing bars E. The dogs or latches are arranged in pairs in such a manner that each dog of a pair engages the mouth of a can at a considerable distance from the center line of the nozzles or spraying devices. The two dogs of each pair consequently tend to center the cans or other articles having a substantially circular peripheral portion which the dogs engage since if a can is placed on the machine, as indicated on the right hand side of Fig. 3, out of alinement with the other cans, this can will be engaged by only one of the dogs or latches and since the point of contact between the dog and the article is at a considerable distance from the central vertical axis of the article, this dog will tend to swing the can or analogous article toward the center of the track until the same engages the other dog or latch of the pair, whereupon the can will continue to move centrally through the machine. It will also be noted that the machine is capable of operating on cans or articles of a large number of different sizes providing that the cans or articles are not so small as to pass between the two dogs or latches of a pair. Article-engaging means of other suitable construction may be employed if desired.

The mechanism shown in Figs. 1 to 8 for passing the can covers Y or other articles through the machine includes a plurality of grids or tracks $g$ supported on posts or uprights $g'$ extending upwardly from the transverse frame member C and the bar $c^3$ may also act as a support or grid for the articles Y. The articles are advanced by means of mechanism similar in construction and operation to that employed in connection with the can-advancing mechanism which has been described, namely two pairs of parallel reciprocatory article-advancing bars H having dogs or latches H' pivotally arranged between the bars H. Since the covers are usually much lighter in weight than the cans, means are preferably employed for preventing the articles Y from being carried rearwardly by the action of the dogs H' and for this purpose a second series of dogs or latches I is preferably provided, which are pivoted at $i$ on the fixed grids or tracks $g^2$. These dogs are weighted at $i'$ so that they normally assume the position shown in Fig. 8. When, however, the article-advancing mechanism, including the dogs H', feeds the articles Y over the dogs I, these dogs may swing about their pivots to permit the articles to pass. The dogs I are also arranged in pairs and spaced apart so that any tendency of the articles to move rearwardly is resisted thereby in such a manner as to tend to center these articles, since a rearward pull exerted on an article will move the article, if it is not correctly centered in the path of movement, first against one of the dogs I and then centrally until the article engages also the other dog.

The mechanism for reciprocating the article-advancing bars E and H may be of any suitable or desired construction. As shown in Figs. 5 and 6, the ends of each of these bars are connected to a reciprocatory connecting bar or crosshead K which is slidable lengthwise of the machine. The opposite ends of this bar are pivotally connected in any suitable manner with connecting rods $k$ which are actuated by means of cranks $k'$ suitably secured on the opposite ends of a crank shaft $k^2$. Adjacent to one end of this crank shaft is secured a mutilated pinion $k^3$ which meshes with a gear $k^4$ which may be turned in any suitable or desired manner. In the construction shown the gear is mounted on a shaft $k^5$ on the other end of which a reducing gear $k^6$, Fig. 5, is mounted, which is driven from a shaft $k^7$. The gear $k^4$ is so formed that during half of the revolution thereof the pinion $k^3$ is turned through a complete revolution and during the other half of the revolution of the gear $k^4$ the pinion remains idle. A complete revolution of the pinion causes the crank to move the crosshead K through the medium of the connecting rod $k^2$ to its advanced position and then back to its initial position, shown in Fig. 6. During the interval that the pinion is not turning and during the return stroke of the article-advancing bars, the cans or other articles are standing still to be either subjected to the action of the washing means or to be drained. Means of any other suitable construction for intermittently reciprocating the article-advancing bars may be employed if desired.

The means for supplying washing or rinsing fluid to the articles to be washed may be of any suitable or desired construction. In the embodiment of the invention shown in Figs. 1–8, two different sets of discharge or spray devices are employed, one of which may, for example, be used for supplying washing fluid to the articles and the other may supply a rinsing fluid. Preferably the two sets of spraying devices are spaced apart so that the articles may drain for an interval of time after leaving the first spraying device and before passing to the second set of spraying devices. The first set of spraying devices receives its liquid from a pipe L and the second set of spraying devices is supplied by a pipe L'. Since the two spraying devices are substantially identical in construction, only the first of these devices will be described. The pipe L connects with a short pipe section $l$ which is inclined and which connects with a transverse portion $l'$ of a longitudinal spray pipe section $l^2$. The transverse portion $l'$ is provided with an opening at the opposite side thereof with which a section $l^3$ connects, similar to the section $l$, and this section $l^3$ in turn connects with a transverse portion $l^4$ of a longitudinal spray pipe section $l^5$. The other open end of the transverse section $l^4$ is closed by means of a cap or plate $l^6$. The longitudinal spray pipe sections $l^2$ and $l^5$ are each provided with a pair of spray devices and the ends of the sections are adapted to connect with additional lengths of spray pipes or with a cover plate. One end of the spray pipe section $l^2$ is closed, in the construction shown, by means of a cap or plate $l^7$ and to the other end is connected one end of a second spray pipe section $l^8$, the other end of which is closed by means of a plate $l^9$. It will be obvious that any number of sections similar to the section $l^8$ may be added if a larger number of spray devices is desired.

The spray devices on the pipe sections are formed on flat topped bosses or projections M extending upwardly from the upper faces of the longitudinal pipe sections. In the particular construction shown, each of the bosses is provided in its upper face with a plurality of holes in which plugs or nozzles $m$ are secured, each of the nozzles having a discharge orifice for the liquid. Preferably these nozzles have a screw threaded engagement in the holes in the portions M of the pipe sections so that they may be readily removed in case they become plugged up or otherwise impaired in their action. The series of spray pipe sections fed by the pipe L', as has been stated, are similar in construction to those described except that since only two sets of spraying devices are used, the longitudinal pipe sections $l^8$ are omitted.

The pipe sections of the spraying devices may be mounted on the frame of the machine in any suitable or desired manner, the longitudinal pipe sections in the construction shown being provided at intervals with pedestal or foot portions N which rest upon the transverse supporting member C and are preferably secured thereto by means of bolts $n$ or the like.

By forming the pipe sections with the enlarged portions or bosses integral therewith, which act as spray boxes, the cost of the spraying means is considerably reduced and the assembling of the same is greatly facilitated. By means of the construction described, the spray devices and connecting pipes are formed as units and as many units as may be described can be secured together to form a spray pipe of any desired length. Any other means for supplying the necessary cleansing fluid to the articles passing through the machine may be provided if desired.

In the modified construction shown in Figs. 9 to 15, the cans to be cleansed are supported on a pair of reciprocatory article-supporting bars or grids O which are preferably of angle shaped cross section. These bars may be reciprocated by mechanism similar to that described in connection with Figs. 1-8. The bars O rest upon the antifriction rollers or wheels $o$ which, in the construction shown, are journalled on pins or pintles $o'$ secured on a spray pipe P. This pipe is preferably substantially rectangular in cross section and is provided at intervals with discharge orifices $p$ for the cleansing fluid. A supply of fluid is fed to the spray pipe P by means of a transverse pipe $p'$ which may be of any suitable or desired construction. The spray pipe P in this construction supports the can-supporting and advancing mechanism.

Figure 12:
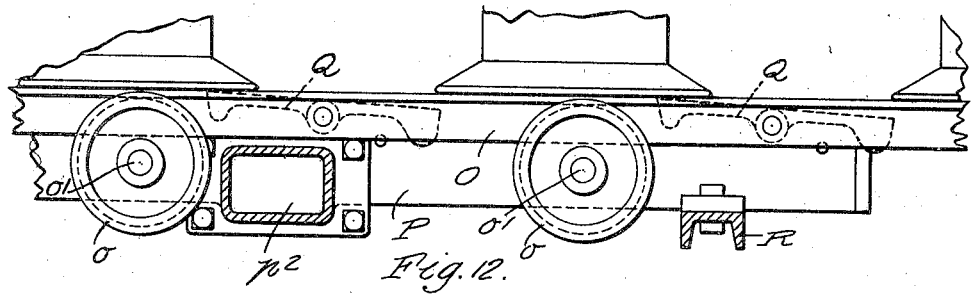
Fig. 12 is a fragmentary longitudinal sectional elevation similar to Figs. 10 and 11, showing the parts of the mechanism in different relative positions.
Figure 13:
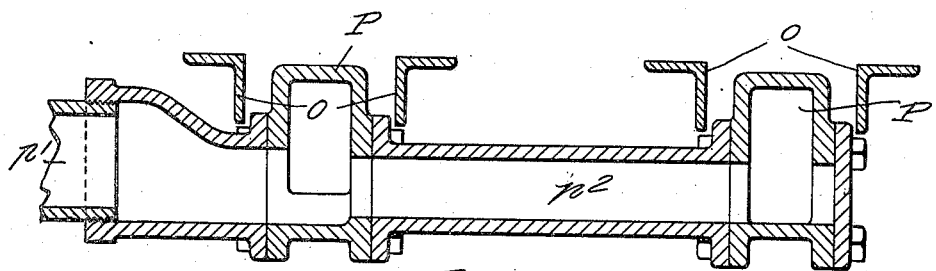
Fig. 13 is a fragmentary transverse sectional elevation of the machine showing the means for supplying cleansing fluid to both of the tracks for carrying articles through the machine.

The cans or articles to be washed are advanced by the forward movement of the reciprocatory bars O, and the articles are prevented from moving rearwardly with the bars during their return stroke by means of a plurality of dogs or latches Q mounted on stationary pivots secured to the opposite sides of the spray pipe P. Since the dogs are arranged on opposite sides of the spray pipe they will center the articles since during the rearward movement of the reciprocatory bars O these bars will draw the articles against the dogs or latches Q and if an article is not correctly centered it will engage first one of the dogs, whereupon the friction between the articles and the reciprocatory supporting bars O will tend to draw the articles rearwardly and toward the center of the path of movement of the articles until they engage both of the dogs or latches Q. The dogs also positively hold the cans or other articles in correct relation to the spray devices. The spray pipe P may be supported in any desired manner from cross bars or members R of the frame of the machine and Fig. 13 shows the two spray pipes for the cans and the covers connected by a transverse pipe $p^2$. The construction of the mechanism for washing the can covers preferably is similar to that used for washing the cans and for that reason is not described.

In both of the constructions described, the cans or other articles upon which the machine is intended to operate are centered relatively to the path of movement of the articles by means of dogs, latches or the like, which engage the lower portions of the articles in such a manner as to swing the same toward the center of the path of movement. This construction eliminates the necessity of using the usual guide rails engaging the sides of the articles for centering the same and which can necessarily accurately center only articles of one size. The mechanism described may be operated on any articles which have a substantially circular periphery or which are polygonal in shape so as to approximate a circular form.

We claim as our invention:—

1. In a washing machine for cans and analogous articles, the combination of a support on which the articles may be moved longitudinally and transversely, spraying devices centrally arranged with reference to said support, article-advancing means arranged in proximity to said support and at opposite sides of said spraying devices, upwardly extending article-engaging portions secured to said article-advancing means and adapted to engage substantially circular portions of said articles at opposite sides thereof to advance said articles and to swing the same into central positions with reference to said support, and stationary article-engaging portions arranged at opposite sides of said support and adapted to engage said substantially circular portions of articles to prevent return movement thereof and to center said articles with reference to said spraying devices.

2. In a washing machine for cans and analogous articles, the combination of a support on which the articles may be moved longitudinally and transversely, spraying devices centrally arranged with reference to said support, article-advancing means arranged in proximity to said support and at opposite sides of said spraying devices, upwardly extending article-engaging portions secured to said article-advancing means and adapted to engage substantially circular portions of said articles at opposite sides thereof to advance said articles and to swing the same into central positions with reference to said support, and dogs arranged on substantially stationary pivots and adapted to engage the articles to prevent rearward movement thereof, said dogs being arranged at opposite sides of said spraying devices and being adapted to engage substantially circular portions of said articles at opposite sides thereof to center the same with reference to said spraying devices.

3. In a washing machine for cans and analogous articles, the combination of a support on which the articles may be moved longitudinally and transversely, spraying devices centrally arranged with reference to said support, article-advancing means arranged in proximity to said support and at opposite sides of said spraying devices, and stationary article-engaging portions arranged at opposite sides of said support and adapted to engage substantially circular portions of articles to prevent return movement thereof and to center said articles with reference to said spraying devices.

4. In a washing machine for cans and analogous articles, the combination of a support on which the articles may be moved longitudinally and transversely, spraying devices centrally arranged with reference to said support, article-advancing means arranged in proximity to said support and at opposite sides of said spraying devices, and dogs arranged on substantially stationary pivots and adapted to engage the articles to prevent rearward movement thereof, said dogs being arranged at opposite sides of said spraying devices and being adapted to engage substantially circular portions of said articles at opposite sides thereof to center the same with reference to said spraying devices.

FRANK F. WOLF.
JOHN W. CHARLTON.